(No Model.)

E. J. WORCESTER.
DRILLING MACHINE.

No. 287,209. Patented Oct. 23, 1883.

Witnesses:
R. B. Fowler
H. M. Fowler

Inventor:
Edward J. Worcester
By his Atty,
Rufus Bennett Fowler.

United States Patent Office.

EDWARD J. WORCESTER, OF WORCESTER, MASSACHUSETTS.

DRILLING-MACHINE.

SPECIFICATION forming part of Letters Patent No. 287,209, dated October 23, 1883.

Application filed December 11, 1882. (No model.)

*To all whom it may concern:*

Be it known that I, EDWARD J. WORCESTER, a citizen of the United States, residing at Worcester, in the county of Worcester and State of Massachusetts, have invented a new and useful Improvement in Self-Feeding Drilling-Machines, of which the following is a specifiation.

My invention relates to an improved mode of connecting the crank-shaft and balance-wheel shaft, and has for its objects to cause the balance-wheel shaft to rotate with an increased speed in the same direction as the crank-shaft; also, to easily disconnect the two shafts, so the momentum of the balance-wheel may be applied to or disengaged from the drill-spindle; and, further, to avoid the friction and consequent loss of power attendant upon the use of gear-wheels for driving the balance-wheel.

Figure 1:
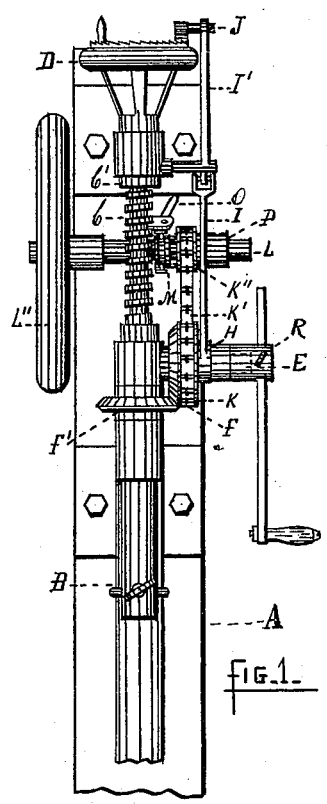
Figure 2:
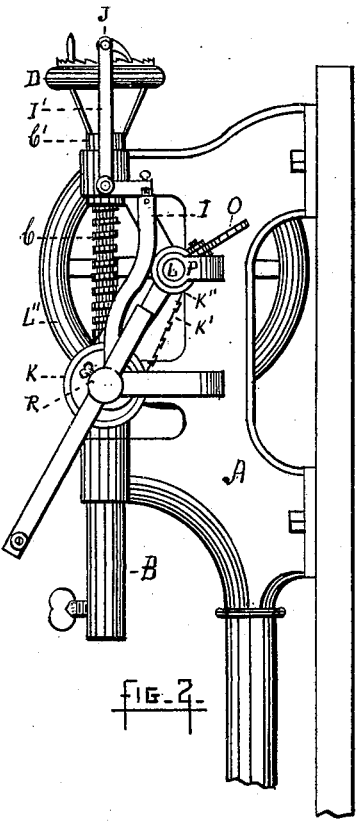
Figure 3:
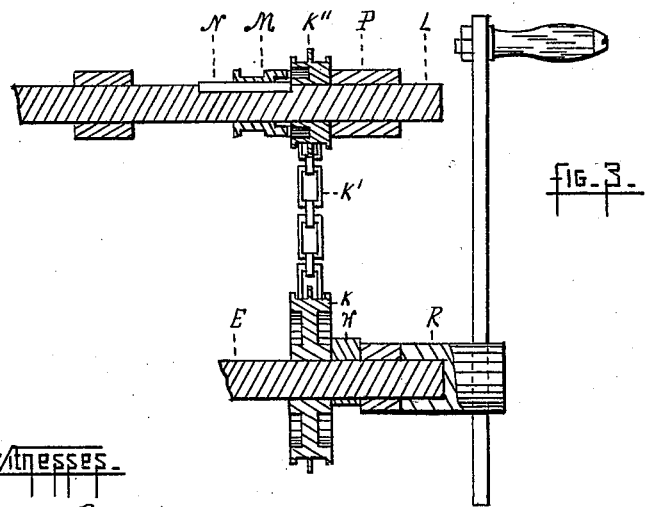

In the accompanying drawings, Figure 1 shows a front elevation of a drilling-machine embodying my invention. Fig. 2 is a side elevation of the same; and Fig. 3 is a sectional view of a portion of the crank and balance-wheel shafts, like letters referring to like parts in the several views.

A is the frame, B the drill-spindle, C the feeding-screw, and C' the rotating nut actuated by the ratchet-wheel D, all these parts being arranged and operating in a manner common in drilling-machines.

E is the crank-shaft, having the bevel-gear F, which drives the drill-spindle through the bevel-gear F'. An eccentric, H, on the crank-shaft E and the connecting-rod I vibrates the bell-crank lever I', carrying the pawl J, thereby causing an intermittent motion of the ratchet-wheel D. Upon the crank-shaft E, I place the sprocket-wheel K, carrying the driving-chain K', and by means of the smaller sprocket-wheel K'' on the shaft L imparting a rapid motion to the shaft L and balance-wheel L''.

The spocket-wheel K'' is attached to the shaft L by the sliding clutch M and spline N. This clutch may be operated by the hand-lever O, and when it is desired to disconnect the balance-wheel the clutch M is disengaged from the sprocket-wheel K'', which will then revolve loose on the shaft L, being held in position between the bearing P and the spline N.

The crank-hub R may be attached to either the shaft E or L, as may be desired. This changing of the crank from one shaft to the other is very desirable, as in some cases, when a large drill is used, the crank will be used preferably on the shaft L, thereby giving a slow motion to the drill-spindle, and a corresponding increase of power. In other cases an advantage will be gained by using the crank on the shaft E and obtaining an increased velocity of the balance-wheel, while in some cases, as when a very small drill is used, it may be desirable to disconnect the balance-wheel, so that the resistance to the drill may be felt at the crank.

In most of the self-feeding drilling-machines in common use the function and operation of the several parts are similar; but the combination of the parts varies widely. In some the balance-wheel is attached to the drill-spindle, which is extended through the feeding-screw for that purpose. In others the balance-wheel is placed upon a separate shaft, to which a quicker motion is given by either spur or bevel gears, as the direction of the shafts may determine. By the use of gear-wheels to drive the balance-wheel shaft the loss of power from friction is twofold: first, in applying power at the crank to overcome the inertia of the balance-wheel, and, again, when the momentum of the balance-wheel is applied to the drill-spindle in passing the "dead-points." Therefore it is especially desirable to avoid friction, as far as possible, in that part of the mechanism used to drive the balance-wheel.

I accomplish the above, as well as several other desirable results, by the use of two sprocket-wheels, K and K'', and the driving-chain K' in place of the two spur-gears as ordinarily used. I arrange the shaft L parallel to the crank-shaft E, passing through the frame A, and held in suitable bearings, as shown, the driving mechanism being at one end and the balance-wheel L'' at the opposite end, thereby rendering that portion of the machine very compact. In case the shaft L were driven by spur-gears the distance between the shafts E and L would be determined by the size of the gear-wheels, which could not be very large without rendering the machine cumbersome, unsightly, and inconvenient; but by using the chain driving device above described the shafts E and L may be separated a considerable distance without any increase in the size of the wheels K and K'', thereby permitting the size of the balance-wheel to be increased without bringing it in the way of the operator.

Were the shafts E and L connected by gear-wheels, the motion of L would be in a contrary direction to that of E, which would render the use of the crank on the shaft L extremely inconvenient, as the motion of the crank would be backward; but by my method of driving the balance-wheel shaft the motion of the crank upon either shaft E or L will be the same and forward.

Gear-wheels used in the driving mechanism of drilling-machines are apt to become worn and noisy in their operation, which can only be remedied by replacement, oftentimes at considerable trouble and expense. By the above-described mode the wear is confined principally to the chain, which can be easily replaced and at slight cost.

The several advantages of my improved method of construction and operation are as follows: first, compactness; second, rapid rotation of the balance-wheel; third, ability to increase the distance between the shafts E and L; fourth, confining the wear to a part easily and cheaply replaced; fifth, revolving the shafts E and L in the same direction; sixth, cheapness of construction; seventh, ability to disconnect the balance-wheel from the drill-spindle; eighth, a twofold reduction of friction, thereby largely increasing the power of the drilling-machine.

I do not claim, broadly, the combination, with the drill-spindle, of a balance-wheel placed on an independent shaft and made to revolve at a quicker speed, for this has been done heretofore.

What I do claim as my invention, and desire to secure by Letters Patent, is—

1. The combination, with the drill-spindle B, bevel-gears F and F', and crank-shaft E, of the sprocket-wheels K and K'', chain K', shaft L, and balance-wheel L'', as described, and for the purpose set forth.

2. The combination, with the drill-spindle B, gears F F', sprocket-wheels K K'', chain K', balance-wheel L'', and shaft L, of the sliding clutch-coupling M, as described, and for the purpose set forth.

3. In a drilling-machine, the combination of the crank-shaft E and connected drilling mechanism, sprocket-wheels K and K'', driving-chain K', shaft L, and balance-wheel L'', rigidly attached thereto, and a suitable clutching device on the shaft L, by which the sprocket-wheel K'' may be attached to or disengaged from the shaft L at will, as and for the purpose set forth.

4. In a drilling-machine, the combination, with the crank-shaft E and connected drilling mechanism, and shaft L, having a fly-wheel rigidly attached thereto and connected with the crank-shaft E by suitable driving mechanism, of a suitable clutching device, by which the shaft L may be disconnected from the driving mechanism at will, as and for the purpose set forth.

5. The combination, with the frame A, drill-spindle B, gears F F', and crank-shaft E, of the sprocket-wheels K K'', chain K', shaft L, and balance-wheel L'', all arranged in relation to each other as shown and described, and for the purpose set forth.

EDWARD J. WORCESTER.

Witnesses:
 R. B. FOWLER,
 GEORGE BURNHAM.